United States Patent
Fiorini

(10) Patent No.: US 8,713,545 B2
(45) Date of Patent: Apr. 29, 2014

(54) ARCHITECTURE FOR ACCELERATED COMPUTER PROCESSING

(75) Inventor: Pierre Fiorini, Issy-les-Molineaux (FR)

(73) Assignee: Silkan, Meudon (FR)

(*) Notice: Subject to any disclaimer, the term of this patent is extended or adjusted under 35 U.S.C. 154(b) by 748 days.

(21) Appl. No.: 12/922,210

(22) PCT Filed: Mar. 13, 2009

(86) PCT No.: PCT/EP2009/052968
§ 371 (c)(1),
(2), (4) Date: Sep. 13, 2010

(87) PCT Pub. No.: WO2009/112566
PCT Pub. Date: Sep. 17, 2009

(65) Prior Publication Data
US 2011/0010695 A1    Jan. 13, 2011

(30) Foreign Application Priority Data
Mar. 14, 2008   (FR) ................................ 08 01420

(51) Int. Cl.
*G06F 9/45*   (2006.01)
*G06F 15/16*   (2006.01)
*G06F 9/46*   (2006.01)

(52) U.S. Cl.
USPC .............. 717/149; 709/201; 712/28; 718/102

(58) Field of Classification Search
None
See application file for complete search history.

(56) References Cited

U.S. PATENT DOCUMENTS

| 7,237,229 B2* | 6/2007 | Ogawa et al. ................. 717/125 |
| 2003/0188300 A1* | 10/2003 | Patrudu ........................ 717/149 |
| 2004/0083462 A1 | 4/2004 | Gschwind et al. |
| 2005/0055677 A1 | 3/2005 | Nanja et al. |
| 2005/0071828 A1* | 3/2005 | Brokenshire et al. ......... 717/147 |
| 2007/0283337 A1 | 12/2007 | Kasahara et al. |
| 2007/0294680 A1 | 12/2007 | Papakipos et al. |

FOREIGN PATENT DOCUMENTS

WO      0221268      3/2002

OTHER PUBLICATIONS

IBM, Rechtschaffen, "Using Modified/Unmodified to Replace Send/Receive in Data Parallelism" Dec. 1993, IBM Technical Disclosure Bulletin, vol. 36, Issue 12, pp. 573-576.*
Noll et al., "CellVM: A Homogeneous Virtual Machine Runtime System for a Heterogeneous Single-Chip Multiprocessor," Technical Report 2006, pp. 1-11 XP002503832 (2006).
CRITICALBLUE (No author listed): "Boosting Software Processing Performance With Coprocessor Synthesis," Critical Blue White Paper, pp. 1-6, XP002503721 (Jun. 2005).

* cited by examiner

*Primary Examiner* — James D Rutten
(74) *Attorney, Agent, or Firm* — Baker & Hostetler LLP

(57) ABSTRACT

A data processing system includes a host computer, an additional computer, an application module including a first executable code, a module for analyzing said first executable code and a module for generating a second executable code segmented notably into code blocks which are executed in a preferential manner on one of the two computers. The second executable code includes a sub-module for managing the distribution of the processing operations between the host computer and the additional computer and a sub-module for managing the additional computer as a virtual machine which executes the blocks allocated to the additional computer.

18 Claims, 5 Drawing Sheets

ARCHITECTURE FOR ACCELERATED COMPUTER PROCESSING

CROSS-REFERENCE TO RELATED APPLICATIONS

This application is a National Stage of International patent application PCT/EP2009/052968, filed on Mar. 13, 2009, which claims priority to foreign French patent application No. FR 08 01420, filed on Mar. 14, 2008, the disclosures of which are incorporated by reference in their entirety.

FIELD OF THE INVENTION

The invention relates to the field of computers. More particularly, the invention relates to computers that process intensive loads, which may involve computer systems dedicated to graphical applications or numerical calculation applications, for example.

BACKGROUND OF THE INVENTION

The invention relates to the field of computers which have to process intensive loads. This may involve computer systems dedicated to graphical applications or numerical calculation applications, but it may also involve processors included in signal or data processing chains. Intensive computing machines may be of different types. In most cases, they comprise a plurality of processors among which the parts of an application will be distributed, while the processors share common memory areas. In SMP (Shared Memory MultiProcessor) architectures, the processing operations are distributed among at least two processors which share access to the same common memory. In Distributed Memory Multiprocessor architectures, the distribution of the processing operations will depend on the relative locations of the different processors and stored data, i.e. on the physical architecture and not only on the application. A different form of parallelism may result from processor command instruction sets. This occurs, for example, in the case of SIMD (Single Instruction, Multiple Data) processing operations, in support of which specific instruction sets have been added to the normal instructions. Different instruction sets are thus known, notably SSE (Streaming SIMD Extensions) or AltiVec (trademark registered by Apple, IBM and Freescale Semiconducteurs to designate an SIMD instruction set operating on 128-bit vectors). Acceleration techniques also exist which are based on the realization that a single processor may be perfectly adapted to some of the processing operations that a computer has to perform, whereas, for certain applications, it may require assistance in the form of an additional processor installed on an add-on accelerator card. In this case, the traditional architecture most often involves all of the specialized applications being executed on the add-on card processor. The host structure processor is then underutilized since it will only manage the input/output from the additional processor. For given performance levels, this may result in the need to overdimension the add-on card processor, which will inevitably incur additional cost. The architecture is therefore not optimal.

SUMMARY OF THE INVENTION

The present invention solves this optimality problem by providing means for distributing the processing operations of applications having intensive computing requirements among the host processor(s) and the add-on card processor(s).

For this purpose, the present invention discloses a data processing system including a host computer, an additional computer, an application module comprising a first executable code, a module for analyzing said first executable code and a module for generating a second executable code segmented notably into code blocks which are executed in a preferential manner on one of the two computers, wherein said second executable code comprises a sub-module for managing the distribution of the processing operations between the host computer and the additional computer and a sub-module for managing the additional computer as a virtual machine which executes the blocks allocated to said additional computer.

Advantageously, the analysis module of said data processing system receives as input the first executable code of said application and supplies notably as output metadata comprising the input points of code blocks likely to constitute computing hotspots, the data structures used by said hotspots and the libraries of subroutines called by said first executable code.

Advantageously, the metadata at the output of the analysis module constitutes input of the module for generating the second executable code.

Advantageously, the metadata at the output of the analysis module are validated or modified when the second executable code is executed.

Advantageously, the second executable code is executed in a preferential manner in user mode on the host computer.

Advantageously, the second executable code uses specifically optimized functions installed on a driver which connects the additional computer to the host computer.

Advantageously, the sub-module for managing the distribution of the processing operations between the host computer and the additional computer is programmed to control the execution of the basic blocks on the host computer.

Advantageously, the sub-module for managing the distribution of the processing operations between the host computer and the additional computer is programmed to allow the second executable code to control the application for the execution on the additional computer of blocks chosen on the basis of parameterizable criteria and to regain control of the application at the end of the execution of each block.

Advantageously, the sub-module for managing the distribution of the processing operations between the host computer and the additional computer is programmed so that the blocks of the second executable code are copies of blocks of the first executable code, said blocks of the first executable code being saved in a cache memory.

Advantageously, the sub-module for managing the distribution of the processing operations between the host computer and the additional computer includes instructions to detect the most active code blocks.

Advantageously, the sub-module for managing the distribution of the processing operations between the host computer and the additional computer is programmed in such a way as to switch the execution of the application to the blocks of the first executable code in order to process exceptions.

Advantageously, the sub-module for managing the distribution of the processing operations between the host computer and the additional computer is programmed to make copies of the application context according to parameterizable rules.

Advantageously, the sub-module for managing the distribution of the processing operations between the host computer and the additional computer includes a sub-module for managing a cache memory for executing the application in which the selected data structures are stored to be called by the blocks executed on the additional computer.

Advantageously, the sub-module for managing the additional computer is programmed to execute libraries of subroutines corresponding to execution profiles and semantics defined for specific applications. Advantageously, a virtual machine corresponding to a specific application is dynamically loadable before the launch of said application by the environment.

Advantageously, one of the profiles defines the additional computer as a vector machine.

Advantageously, one of the profiles defines the additional computer as suitable for operating according to a flow computing model.

Advantageously, the sub-module for managing the additional computer includes a high-level programming interface for programming the libraries for each profile.

Advantageously, the sub-module for managing the additional computer includes a low-level programming interface for programming the second executable code.

The use of an architecture according to the invention also offers the advantage that it allows the cost/performance ratio to be improved by an order of magnitude. Moreover, the system offers great versatility and can be optimized for different applications and hardware environments.

BRIEF DESCRIPTION OF THE DRAWINGS

The invention will be more readily understood and its different characteristics and advantages will become evident from the following description of a plurality of embodiments and its attached figures, in which.

DETAILED DESCRIPTION

Figure 1:
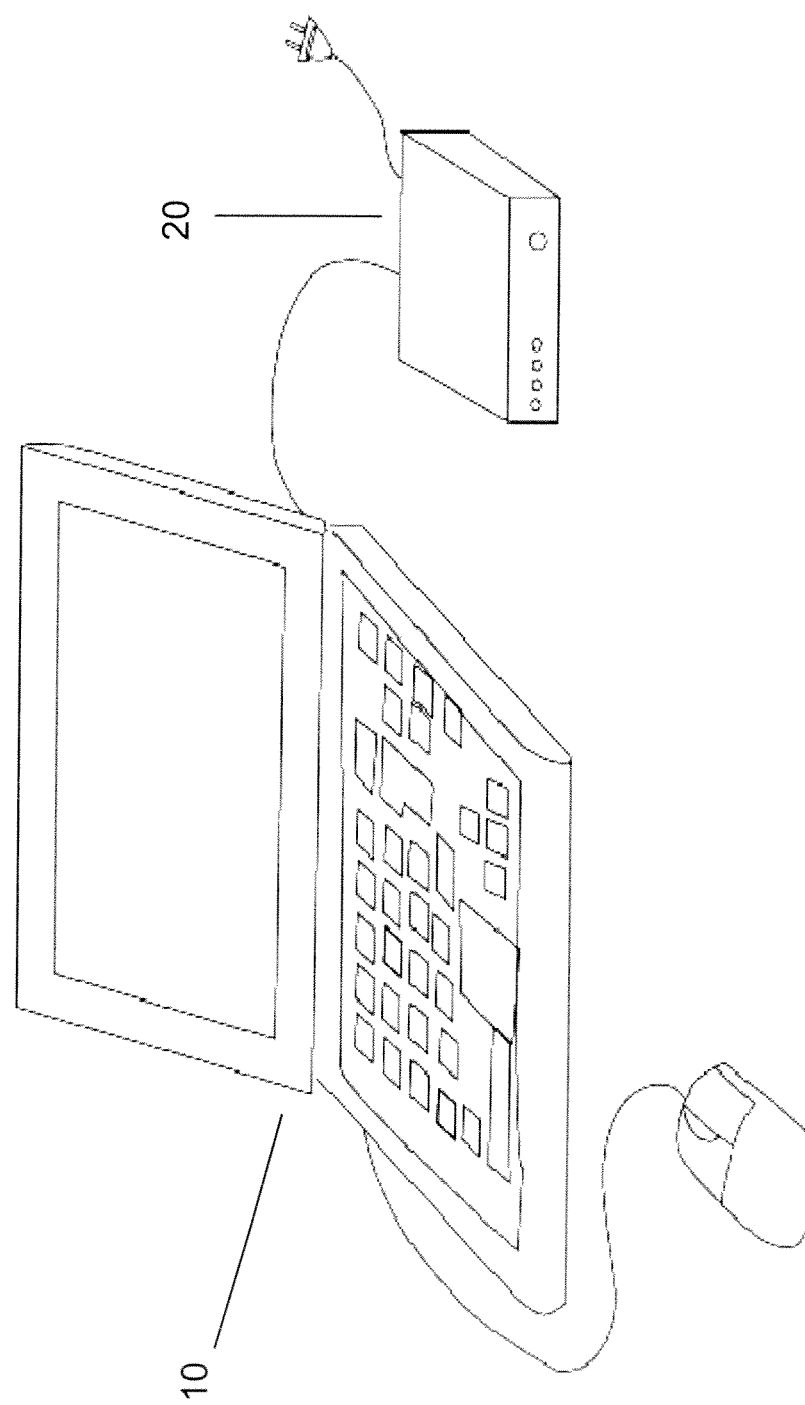
FIG. 1 shows the hardware architecture of a data processing system according to the invention.

In the continuing description, the following expressions are used interchangeably:

Host computer or front-end;
Additional computer or add-on or appliance;
Second executable code or runtime;
Offline;
Program return or call-back;

A typical example of use of the architecture according to the invention will be the connection of an additional computer to a host computer. This computer may be a stationary or portable unit. A case such as this is shown in FIG. 1. The computer 10 may be used by an engineer to execute intensive computing loads. In an alternative use, it may also be used as a gaming terminal, either offline or online with an Internet connection. The host computer is the standard processor of the portable computer such as an Intel Pentium™ or Core Duo™ installed on the motherboard of the portable computer. It may of course be a computer which is possibly used as an application server or data server of a network of client terminals which are connected to it. It may also be a specialized Digital Signal Processor (DSP). The additional computer 20 may in turn be a processor identical to the host computer or an additional processor (DSP for graphical applications and applications which executes many DCT or FFT (Direct Cosine Transform or Fast Fourier Transform) functions. A certain number of circuits must be associated with the additional computer, such as RAM memory circuits and storage elements. Code elements enabling the operation of the computers in cooperative mode as provided for by the invention are installed in these memory circuits. The software system accompanying the appliance is integrated to form a distributed environment between the front-end and the appliance. This environment provides both a static offline analyzer and an optimizing runtime. The environment is possibly extendable by libraries intended to facilitate the programming via an Integrated Development Environment (IDE) for specific application developments. The interfaces provided with the software infrastructure are of different levels, enabling a more or less fine control of this infrastructure. In particular, a driver provides the connection between the two computers. Where appropriate, these elements may be installed via an FPGA or ASIC (Field Programmable Gate Array or Application Specific Integrated Circuit) for the purpose of obtaining higher levels of performance. The external computer, possibly increased with these additional circuits, will normally be integrated into a housing connected to the portable computer via a USB (Universal Serial Bus) or IEEE1384 port. The housing will have a specific power supply. In the case of an office computer or a server, the additional computer and its proximity electronics may be installed on a card which is added to one of the available slots in the computer housing. It can also be envisaged that the additional computing resource is shared among a plurality of computers interconnected via a local network or via an Internet protocol.

Figure 2:
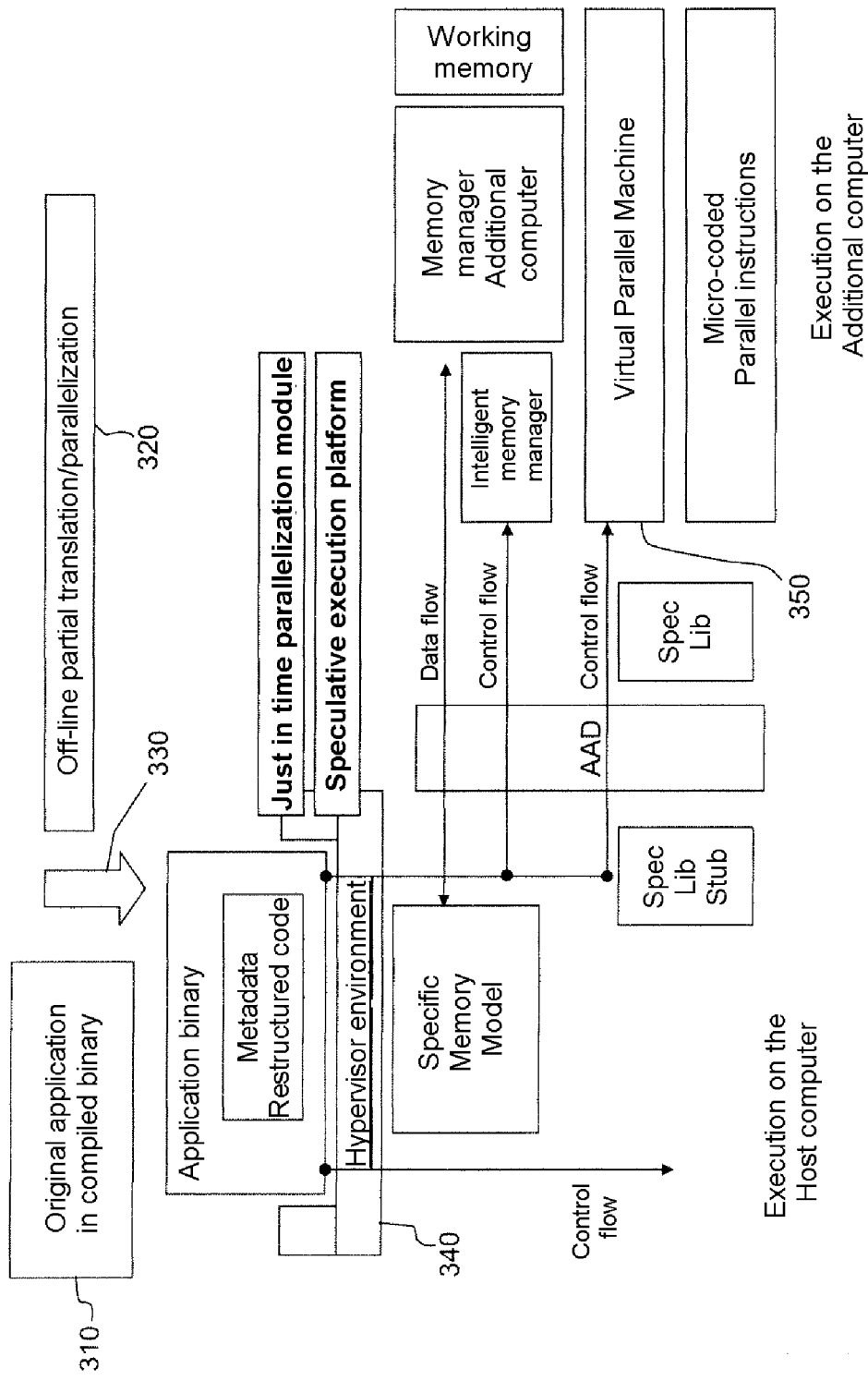
FIG. 2 shows the functional architecture of a data processing system according to the invention.

As shown in FIG. 2, the system includes a module 320 for analyzing the application code 310 before execution. This module works on the application code in binary. Its purpose is to prepare the metadata structures that facilitate the work of the modified executable code before execution. The modified executable code is designated by the expression "runtime" or "second executable code". The application code normally executed on the host computer is designated by the expression "first executable code". The metadata are host structures for data produced by the application code analysis. The module for analyzing the application code has the following functionalities:

it determines the input points of code blocks likely to constitute the execution of computing "hotspots" such as loops; hotspots are understood to be computing blocks which impose an intensive load on the computer which executes them; these blocks are eligible for a dynamic translation on execution, enabling an execution on the additional computer; the term "basic blocks" designates the sets of binary instructions comprising a single input point and a single output point;

The analyzer is also intended to identify the data structures used by these hot blocks; these data structures are intended to be executed preferably on the additional computer, their access to the host computer being effected only via a paged cache;

finally, the analyzer is tasked with determining the libraries that will be dynamically loaded by the code; in some cases, optimized versions of these libraries will be able to be supplied in addition to the software environment: The analyzer will then be tasked with identifying the calls that can be rerouted to optimized versions.

The analyzer generates a set of metadata which prepares the work of the offline translator. However, the offline analyzer does not in any case modify the executables: these metadata are maintained independently from the program for implementation by the second executable code. A joint file is created which contains all of the information extracted from the application. The parts of the code most likely to become execution hotspots are translated into an intermediate language based on the x86 binary. The generation of the parts of the program that are intended for an execution on the accelerator is substantially facilitated by this transformation.

If the source code is available, the introduction of annotations by a programmer guiding the production of metadata by the code analyzer is possible.

The executable code of the application is converted into a second executable code structured in blocks, the execution of which is controlled by an application supervision and optimization environment. This supervision environment may be supported in some cases by specific libraries allowing parallelization of the execution between the two computers and implementation thereof in a possibly speculative manner. The speculative execution is based in particular on an anticipation of the loop output values, normally allowing time-saving. The LAPACK or Linear Algebra Package library can be cited as an example of a specific library for scientific computing.

The second executable code is structured in blocks which are likely to be executed either on the host computer or on the additional computer. It is executed via an environment playing both the role of a hypervisor 20 which controls the execution of the application on the host computer and the role of a virtual machine 30 which executes code blocks on the additional computer. This second executable code is executed insofar as possible in user mode on the host computer and not in system mode, insofar as a transition from user mode to system mode resembles a system call. However, for certain functions, this second code is supported by a driver 40 which provides the connection of the additional computer. The processing operations are arranged in such a way that calls to the OS (Operating System) of the host computer are minimized.

The hypervisor 20 shown in FIG. 2 is a software module which provides for the distribution of processing operations among a plurality of computers. The hypervisor according to the invention provides for the execution of the blocks of the second executable on the host computer. It allows the environment to regain control of the application to ensure that certain carefully chosen blocks will be executed on the appliance. The blocks that are executed are copies of the active code blocks maintained in a cache. These copies are equipped with patches or pieces of executable code to provide them with the information enabling detection of the most active blocks. The execution under the control of the hypervisor may, if necessary, resume on an exact copy of the application code if the latter is capable of providing precise information on the status of the execution as may be necessary for the processing of exceptions in particular.

At the end of the execution of a block, control reverts to the hypervisor, in such a way as to permit the latter to control the choices in terms of application control flow. If necessary, the hypervisor provides the maintenance of a copy of the application context. In the case of a transfer of the control flow to the appliance, this indirection of the control flow takes the form of an emulation of a function call in the execution on the front-end. The hypervisor ensures the capture of the system calls, call backs, exceptions, and also the calls to the dynamic libraries in such as way as to provide for their execution, while allowing it subsequently to resume control.

The hypervisor manages the execution memory model for the application via a specific module 50. This module supplies the application with a data cache for the data structures that have been selected for allocation to the memory of the additional computer. The change in the control flow to the additional module therefore entails a synchronization of the modified pages to the memory of the module.

Figure 3:
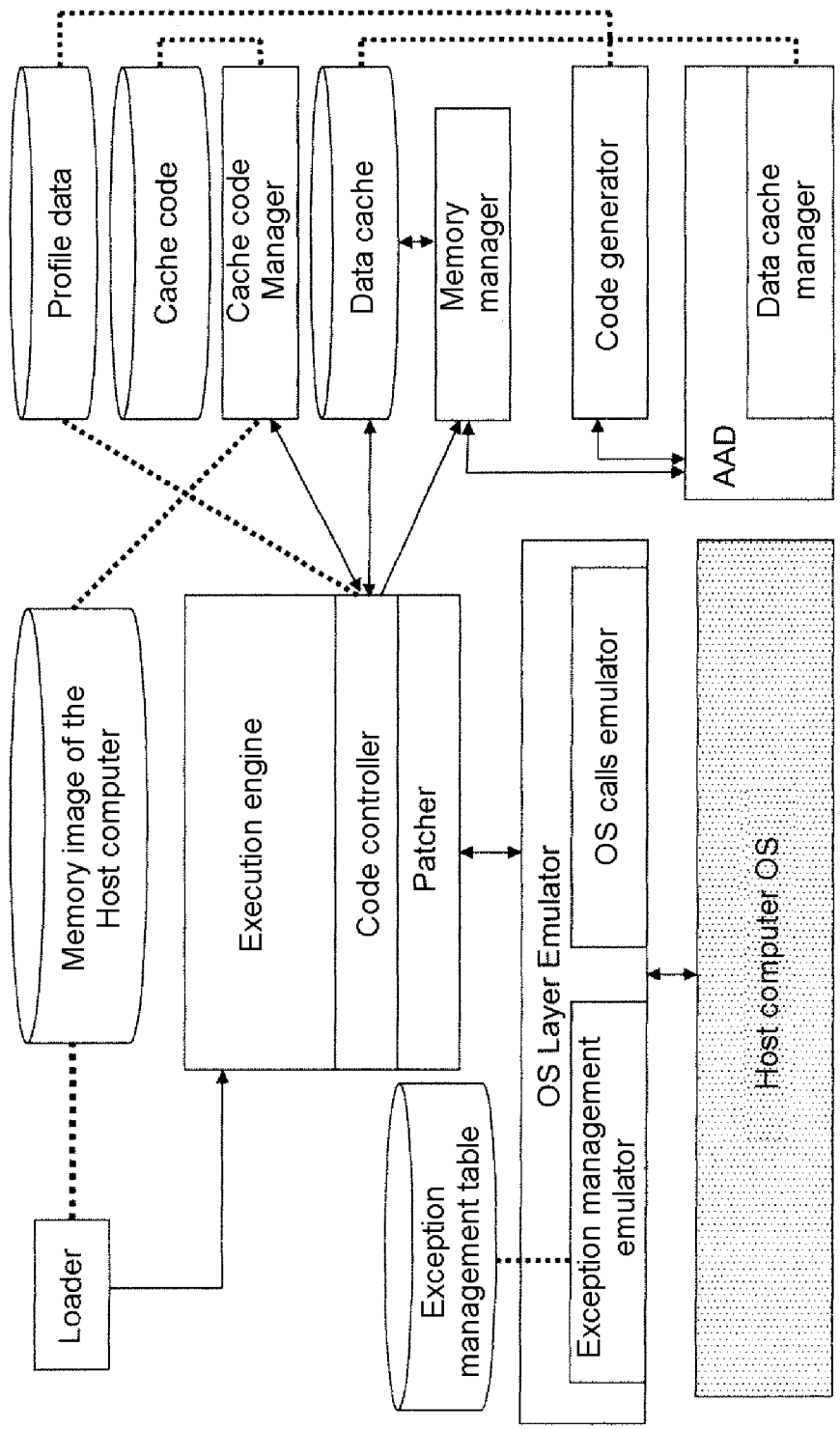
FIG. 3 shows the elements of a hypervisor according to the invention.

FIG. 3 shows a possible architecture of a hypervisor according to the invention; The Hypervisor RunTime (HRT) is executed in user mode and is a standard process comprising a certain number of threads, or sub-processes, which are executed to supply a certain number of emulation services around the application:

Loader: provides for the initialization of the launch of an accelerated application;

Execution Engine: manages the control flow of the application threads;

Code Cache Manager: manages the copy of the code pages to be executed;

OS Layer Emulator: provides for the interface with the OS in such a way as to ensure that the Execution Engine does not lose control of the application;

Memory Manager: manages the allocation of the memory to the application heap;

Code Generator: dynamically generates the translated code for its execution on the additional computing module.

A certain number of data structures allow the hypervisor to manage the application threads:

Code Cache: contains the copies of the pages of the application code which must be executed on the front-end.

Data Cache: contains the copies of the pages of the application heap necessary for the front-end execution.

Profile Data: contains information on the application thread execution dynamics.

Exception Side Table: contains the information necessary for exception emulation.

It is supplemented by a driver which is executed in system mode, the Appliance Architecture Driver (AAD) described below.

The accelerated application does not constitute an autonomous process, but is executed within the HRT process. All of the threads describing the application control flows are native threads created within the HRT process.

The loader replaces the system loader from the perspective of the application. It loads the different data relating to the executable of the application in the HRT.

The loader is responsible for creating the data structures in the HRT which the creation of a system-level new process would initialize. If an application is registered as eligible for acceleration, a pre-initialized structure is maintained in anticipation in such a way as to accelerate the launch of the executable.

The loader provides for the processing operations associated with the launch of the application process. It allocates the memory and loads the constituent elements of the process: context, image, etc. In the case of an implementation under Windows, the loader manages in particular the cases in which the executable is an MS-DOS, Win16 or POSIX executable, in order to be able to provide for the launch of the associated images.

After the end of the process initialization, the loader hands over to the Execution Engine.

The Execution Engine provides for the monitoring of the application thread control flow. It is responsible, in particular, for the switchover of the execution between the front-end and the appliance. The Code Cache Manager provides for the loading of the code pages which are to be executed by the application threads.

The Code Generator uses the metadata associated with the application code to select the blocks that will be executed on the appliance. Once these blocks have been selected, it is responsible for generating the virtual machine code that is required for the execution of the blocks on the appliance, then for transmitting them to the virtual machine using the Architecture Driver.

The OS Layer Emulator is responsible for emulating the interactions between the application threads and the system in order to avoid the loss of control of the application by the hypervisor.

The HRT process heap is the heap used by the Execution Engine. The heap corresponding to the different application threads is, for its part, allocated in the appliance memory. A Data Cache with the granularity of the page contains a copy of the pages accessed by the threads during execution on the front-end. From the perspective of the operating system, this Data Cache is a memory-mapped file. The Memory Manager creates a Data Cache structurization. The application code is consequently modified in anticipation.

The mechanism for managing the operating system memory naturally ensures the provision of a copy of the page concerned insofar as a datum is accessed by a thread on the front-end. The page absence is captured by the Execution Engine which transfers the request to the AAD.

Conversely, when control is transferred to the appliance, the Execution Engine ensures that all of the pages whose copies have been modified are recopied on the additional computer.

The Memory Manager is responsible for allocating the dynamic data in the application heap located on the additional computer.

L'AAD performs all of the low-level data transfers between the host computer and the additional computer.

The transfers between the two computers consist, on the one hand, of codes to be executed and, on the other hand, of data pages linked to the management of the heap.

Figure 4:
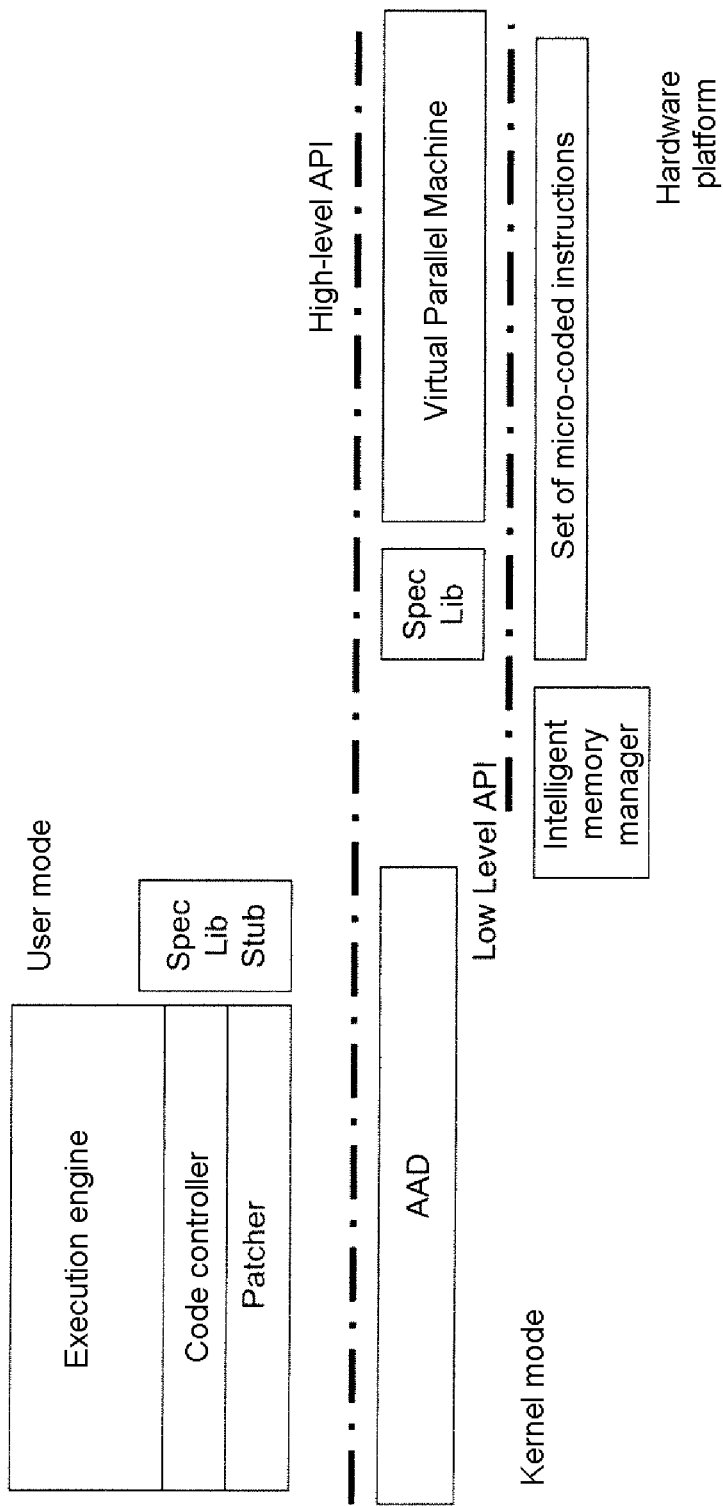
FIG. 4 shows the elements of a distributed virtual machine according to the invention.

The structure and function of the virtual machine implemented in the second executable code will now be described with reference to FIG. 4.

The code on the additional computing module is executed on a virtual machine consisting of an implementation on the specific circuit of the accelerator of a generic parallelism model. This virtual machine is supplemented by a set of libraries. A "virtual machine+libraries" package defines a profile and corresponds to an execution semantic. The profiles may be specific to particular applications. A virtual machine is dynamically loadable before the launch of an application by the environment.

One of the parallelism models shown defines the additional computer as a vector machine, therefore having instructions on the data represented in the form of vectors. A flow computing model is also provided for, in which the data are supplied to cores in the form of data flows.

It is then possible to define modules directly using the high-level instruction set of the virtual machine and the Application Programming Interface (API). The assembly constitutes a high-level API for each profile, an API which may remain temporally stable to ensure the sustainability of the developments implemented. The developments on the profiles are carried out in a high-level language which is readily accessible to the person skilled in the art of programming.

The virtual machine and the libraries are themselves supported by a micro-coded runtime depending on the module hardware. The module integrates in particular specific memory management instructions with a specific hardware platform. This runtime is programmable by a low-level API which is not a priori exposed to the front-end system environment. It is provided as firmware which, by default, is not modifiable in a normal function of the appliance. However, new firmware may be loaded through modification of a flash memory.

Figure 5:
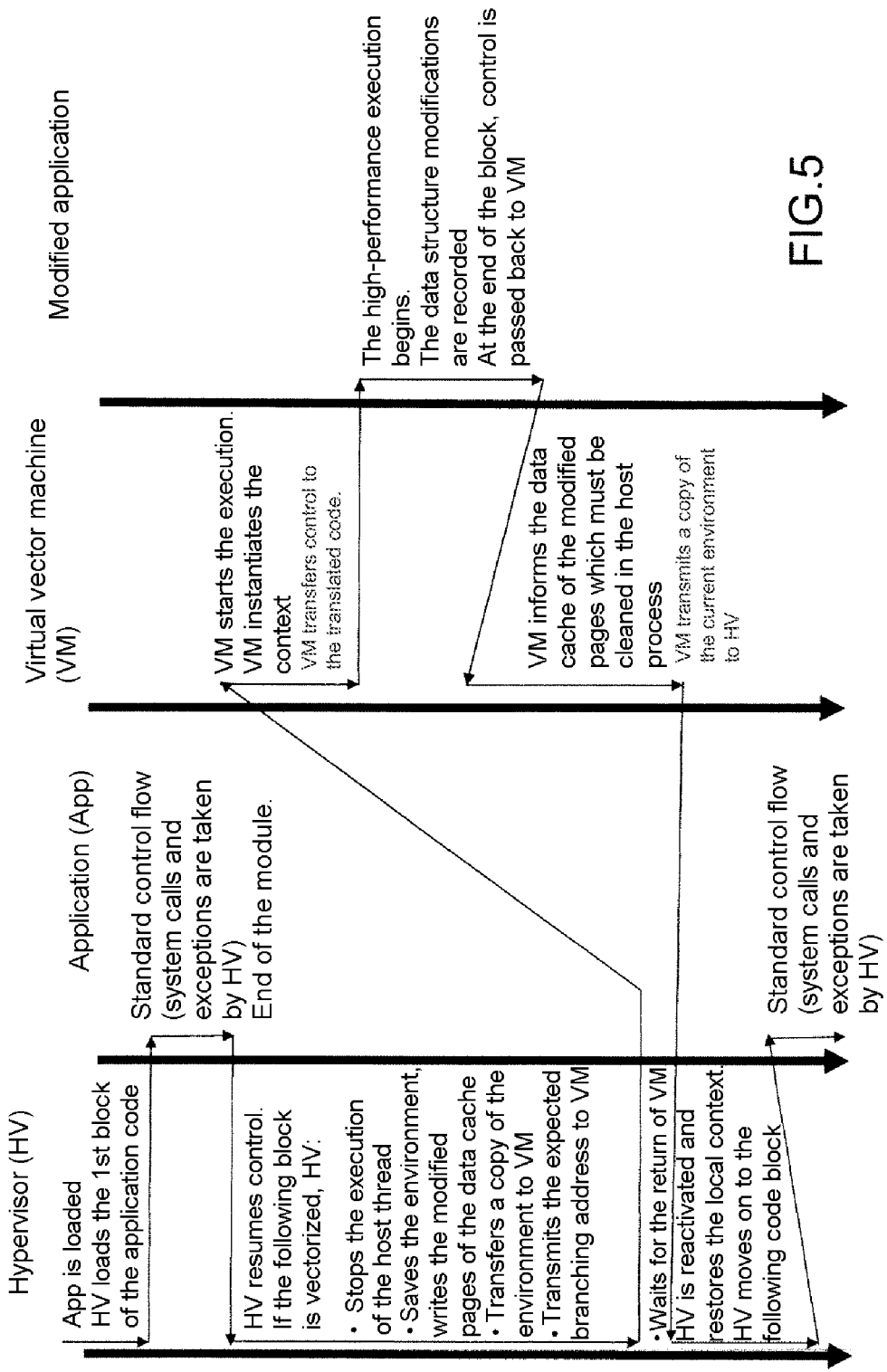
FIG. 5 shows the concatenation of the processing operations in one embodiment of the invention.

FIG. 5 shows the concatenation of the processing operations in one of the modes of use of the data processing system according to the invention.

The launching of the program is carried out in the runtime system environment which then loads the application executable. The first code blocks are copied in the code cache and the execution is transferred to the first block to be executed. At each end-of-block, control is transferred to the hypervisor so that it determines a possible transfer of the flow to the virtual machine. The hypervisor also regains control in the event of system calls or exceptions which occur during execution. If a flow transfer must be implemented to the virtual machine, the hypervisor emulates a function call by pushing the context of the front-end process and the return address onto the stack, and by transmitting a copy of this context to the virtual machine. The machine initializes itself by instantiating the context which has just been transmitted to it, and begins to execute the corresponding translated code. The virtual machine maintains information on memory pages modified during the operations implemented by the translated code.

At the end of the execution, the information collected on the memory modifications serves to invalidate the corresponding pages of the data cache. The modifications which the environment has undergone are also transmitted in such a way as to consequently modify the front-end process environment before it is restored. The virtual machine is stopped and the control flow is resumed by the hypervisor which relaunches the front-end process.

The description which has just been given of different embodiments of the invention does not limit the scope of said invention to said embodiments. Said scope is defined by the claims which follow.

The invention claimed is:

1. A data processing system, comprising:
a host computer;
an additional computer;
an application module comprising a first executable code;
a module for analyzing said first executable code; and
a module for generating a second executable code segmented into code blocks which are to be executed in a preferential manner on one of the host and the additional computers, a selection of one of the host and the additional computers on which the code blocks are to be executed based upon characteristics of the first executable code collected at an output of the module for analyzing the first executable code, wherein:
(i) said second executable code comprises a sub-module for managing the distribution of the processing operations between the host computer and the additional computer and a sub-module for managing the additional computer as a virtual machine which executes the code blocks allocated to said additional computer, and
(ii) the analysis module is configured to receive at an input the first executable code of said application module and configured to supply as output metadata comprising input points of the code blocks which constitute computing hotspots, the data structures used by said hotspots and libraries of subroutines called by said first executable code.

2. The data processing system of claim 1, wherein the metadata at the output of the analysis module includes input of the module for generating the second executable code.

3. The data processing system of claim 1, wherein the metadata at the output of the analysis module are validated or modified when the second executable code is executed.

4. The data processing system of claim 1, wherein the second executable code is executed in a preferential manner in user mode on the host computer.

5. The data processing system of claim 1, wherein the second executable code uses specifically optimized functions installed on a driver which connects the additional computer to the host computer.

6. The data processing system of claim 1, wherein the sub-module for managing the distribution of the processing operations between the host computer and the additional computer is programmed to control the execution of the basic blocks on the host computer.

7. The data processing system of claim 1, wherein the sub-module for managing the distribution of the processing operations between the host computer and the additional computer is programmed to allow the second executable code to control the application for the execution on the additional computer of blocks chosen on the basis of parameterizable criteria and to regain control of the application at the end of the execution of each block.

8. The data processing system of 1, wherein the sub-module for managing the distribution of the processing operations between the host computer and the additional computer is programmed so that the blocks of the second executable code are copies of blocks of the first executable code, said blocks of the first executable code being saved in a cache memory.

9. The data processing system of claim 1, wherein the sub-module for managing the distribution of the processing operations between the host computer and the additional computer includes instructions to detect the most active code blocks.

10. The data processing system of claim 1, wherein the sub-module for managing the distribution of the processing operations between the host computer and the additional computer is programmed in such a way as to switch the execution of the application to the blocks of the first executable code in order to process exceptions.

11. The data processing system of claim 1, wherein the sub-module for managing the distribution of the processing operations between the host computer and the additional computer is programmed to make copies of the application context according to parameterizable rules.

12. The data processing system of claim 1, wherein the sub-module for managing the distribution of the processing operations between the host computer and the additional computer includes a sub-module for managing a cache memory for executing the application module in which the selected data structures are stored to be called by the blocks executed on the additional computer.

13. The data processing system of claim 12, wherein the sub-module for managing the additional computer is programmed to execute libraries of subroutines corresponding to execution profiles and semantics defined for specific applications.

14. The data processing system of claim 12, wherein a virtual machine corresponding to a particular application is dynamically loadable before the launch of said application by the environment.

15. The data processing system of claim 12, wherein one of the profiles defines the additional computer as a vector machine.

16. The data processing system of claim 12, wherein one of the profiles defines the additional computer as suitable for operating according to a flow computing model.

17. The data processing system of claim 12, wherein the sub-module for managing the additional computer includes a high-level programming interface for programming the libraries for each profile.

18. The data processing system of claim 13, wherein the sub-module for managing the additional computer includes a low-level programming interface for programming the second executable code.

* * * * *